(12) United States Patent
Miller et al.

(10) Patent No.: US 10,331,137 B2
(45) Date of Patent: Jun. 25, 2019

(54) THRUSTER SYSTEM FOR MARINE VESSELS

(71) Applicant: Correct Craft IP Holdings, LLC, Orlando, FL (US)

(72) Inventors: Eric J. Miller, Orlando, FL (US); William N. Snook, Orlando, FL (US); Adam C. Greer, Orlando, FL (US); Andrew O. Cochrum, Orlando, FL (US)

(73) Assignee: Correct Craft IP Holdings, LLC, Orlando, FL (US)

( * ) Notice: Subject to any disclaimer, the term of this patent is extended or adjusted under 35 U.S.C. 154(b) by 0 days.

(21) Appl. No.: 16/122,246

(22) Filed: Sep. 5, 2018

(65) Prior Publication Data

US 2019/0064821 A1    Feb. 28, 2019

Related U.S. Application Data

(63) Continuation of application No. 16/119,330, filed on Aug. 31, 2018.

(60) Provisional application No. 62/552,642, filed on Aug. 31, 2017.

(51) Int. Cl.

| G05D 1/02 | (2006.01) |
|---|---|
| B63H 25/04 | (2006.01) |
| B63H 5/08 | (2006.01) |
| B63H 25/38 | (2006.01) |
| B63H 21/22 | (2006.01) |
| B63H 21/00 | (2006.01) |

(52) U.S. Cl.
CPC ............. *G05D 1/0206* (2013.01); *B63H 5/08* (2013.01); *B63H 21/22* (2013.01); *B63H 25/04* (2013.01); *B63H 25/38* (2013.01); *B63H 21/24* (2013.01); *B63H 2025/045* (2013.01)

(58) Field of Classification Search
CPC ........ B63H 25/00; B63H 25/02; B63H 25/04; B63H 25/46; B63H 5/00; B63H 5/14
USPC .................... 114/144 R, 151; 440/40, 41, 42
See application file for complete search history.

(56) References Cited

U.S. PATENT DOCUMENTS

| 5,016,553 A * | 5/1991 | Spencer ................. B63H 25/46 114/151 |
|---|---|---|
| 5,704,306 A * | 1/1998 | Den Ouden ............. B63H 5/14 114/151 |
| 6,230,642 B1 * | 5/2001 | McKenney ............ B63H 25/02 114/144 R |

(Continued)

*Primary Examiner* — Lars A Olson
(74) *Attorney, Agent, or Firm* — Allen Dyer Doppelt & Gilchrist

(57) ABSTRACT

A boat comprises a hull, a primary steering mechanism carried by the hull, a control station located on the hull, a helm located at the control station, and a thruster system carried by the hull. The primary steering mechanism, such as a rudder, is operable via the helm with a helm input being derived from operation of the primary steering mechanism thereby. The thruster system includes at least one thruster mounted to the hull, distinct from the primary steering mechanism, and a controller. The controller receives the helm input and is configured with program instructions to operate the at least one thruster responsive to the helm input to supplement a corresponding movement of the hull. The controller can also automatically operate the thruster responsive to direction, speed and ballast inputs.

23 Claims, 1 Drawing Sheet

(56) References Cited

U.S. PATENT DOCUMENTS 7,216,599 B2 * 5/2007 Morvillo ................ B63H 25/02
  114/151
8,069,802 B2 * 12/2011 Morvillo ................ B63H 25/46
  114/151

* cited by examiner

THRUSTER SYSTEM FOR MARINE VESSELS

CROSS-REFERENCE TO RELATED APPLICATION

This application is a continuation of U.S. Non-provisional patent application Ser. No. 16/119,330, filed on Aug. 31, 2018, which claims the benefit of U.S. Provisional Patent Application Ser. No. 62/552,642, filed on Aug. 31, 2017, the contents of which applications are herein incorporated by reference in their entirety.

FIELD OF THE INVENTION

The present invention relates to boats and other marine vessels with one or more maneuvering thrusters, and more particularly, to systems and methods for controlling the operation of such thrusters.

BACKGROUND OF THE INVENTION

Maneuvering thrusters are well known for facilitating the handling of vessels, particularly at lower speeds and/or in situations with limited space available. There are many placements and designs of such thrusters, with placement adjacent the bow and/or stern being the most common. Thrusters can be retractable into the hull or mounted in fixed locations. Likewise, thrusters can be trainable in different directions or directed along a fixed axis. Thrusters are often controlled via a joystick or other input device located near the helm of the vessel.

Thrusters are especially beneficial on vessels primarily steered with a rudder; which most often are vessels with one or more propeller shafts driven by inboard motors or turbines. At lower speeds, the effectiveness of a rudder as a control surface decreases with decreased water flow across the rudder. This can be particularly the case when the vessel is making sternway. Despite the benefits afforded by thrusters to these and other vessels, further improvements are possible.

SUMMARY OF THE INVENTION

In view of the foregoing, it is an object of the present invention to provide an improved thruster system for marine vessels and related methods.

According to an embodiment of the present invention, a boat comprises a hull, a primary steering mechanism carried by the hull, a control station located on the hull, a helm located at the control station, and a thruster system carried by the hull. The primary steering mechanism, such as a rudder, is operable via the helm with a helm input being derived from operation of the primary steering mechanism thereby. The thruster system includes at least one thruster mounted to the hull, distinct from the primary steering mechanism, and a controller. The controller receives the helm input and is configured with program instructions to operate the at least one thruster responsive to the helm input to supplement a corresponding movement of the hull.

According to an aspect of the present invention, the controller is further configured to distinguish between forward and aft operation based on a direction input when operating the at least one thruster responsive to the helm input.

According to another aspect of the present invention, the controller is further configured to operate the at least one thruster responsive to a vehicle speed input indicative of boat speed.

According to a further aspect of the present invention, a ballasting system is carried by the hull, and the controller is further configured to operate the at least one thruster responsive to a ballast input indicative of a ballast level in the ballasting system.

According to an additional aspect of the present invention, the thruster system further includes a user interface device, the user interface device operable to allow a user to disable automatic control of the at least one thruster by the controller and to select manual control of the at least one thruster via a manual control input.

According to another aspect of the present invention, the at least one thruster includes a stern thruster mounted athwartship at a stern of the hull, such that operation of the stern thruster in opposite directions will urge the stern to port and starboard, respectively. The boat further includes a first exhaust port positioned to vent engine exhaust below a hull waterline at the stern, and a second exhaust port positioned to vent engine exhaust above a hull waterline. A crossover device configured to automatically switch an exhaust vent path between the first and second exhaust ports such that thruster cavitation during operation thereof is prevented.

These and other objects, aspects and advantages of the present invention will be better appreciated in view of the drawings and following detailed description of preferred embodiments.

DETAILED DESCRIPTION OF PREFERRED EMBODIMENTS

Figure 1:
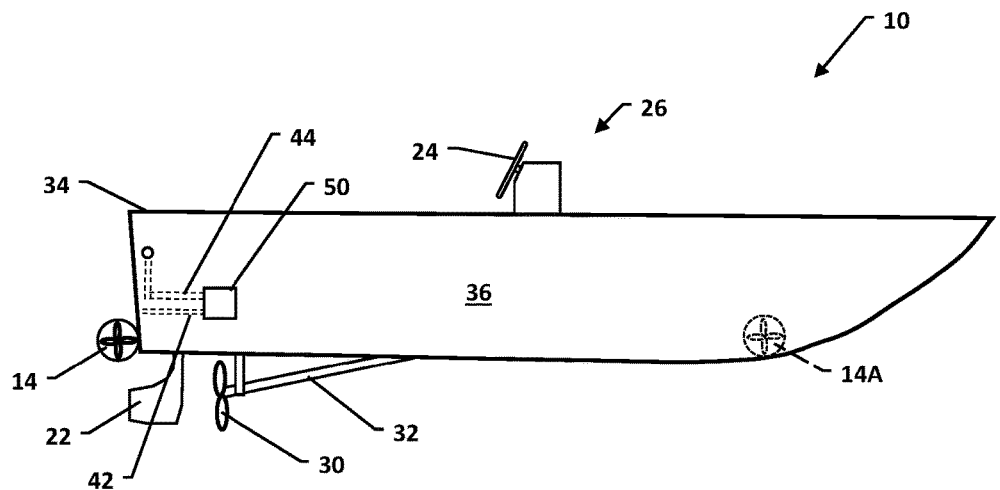
FIG. 1 is a schematic side view of a boat with a thruster system, according to an embodiment of the present invention.
Figure 2:
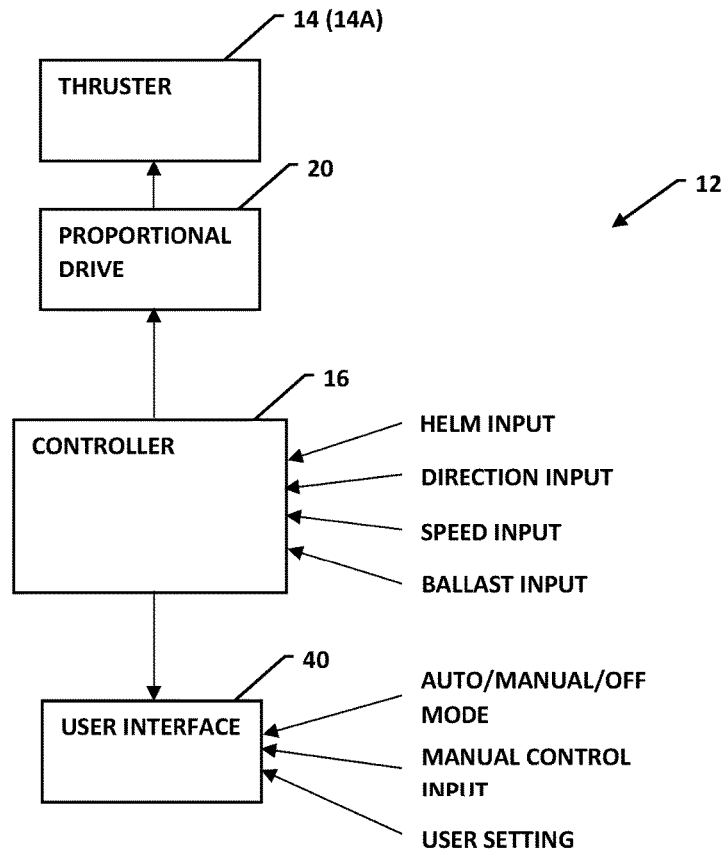
FIG. 2 is a schematic overview of the thruster system of FIG. 1.

According to an embodiment of the present invention, referring to FIGS. 1 and 2, a boat 10 is equipped with a thruster system 12. The thruster system 12 includes at least one thruster 14 operable to impart a degree of lateral motion to a portion of the boat 10. A controller 16 directs operation of the thruster 14, preferably via a proportional drive 20 allowing variable speed operation. The controller 16 is configured to operate the thruster 14 automatically in response to helm input.

In a preferred embodiment, the boat 10 includes a rudder 22 controlled by a helm 24 located at a control station 26. The rudder 22 is positioned aft of a propeller 30 driven by shaft 32 via an inboard motor. Advantageously, the helm input used by the controller 16 for automatic operation of the thruster is derived via monitoring of the rudder 22 position. Other helm inputs could be used, however. For instance, position of the helm 24, itself, could be detected. Additionally, the thruster system 12 could be used to supplement steering in boats with a primary steering mechanism other than a rudder, such as in boats with outboard motors or jet drives, airboats, etc., although superior low speed maneuvering is typically inherent in such vessels.

In the depicted embodiment, the thruster 14 is a stern thruster fixedly mounted to the stern 34 of the hull 36 of the boat 10 at a point below the waterline and oriented athwartship, such that operation in opposite directions will urge the stern 34 to port and starboard, respectively. Alternately, or in addition to, a stern thruster 14, other thrusters (such as a bow thruster 14A) could be used. In general, the controller 16 is configured to automatically operate any thrusters 14 (14A) in response to the helm input such that a movement of the hull corresponding to the detected helm input is supplemented. For example, in the boat 10 equipped with the stern thruster 14, if the boat 10 is making headway and the helm 24 is turned to port, the controller 16 will operate the stern thruster 14 to urge the stern 34 to starboard.

To this end, the controller 16 is advantageously further configured to distinguish between forward and aft operation when automatically operating the thruster 14 (14A) using a direction input. For instance, the controller 16 receives a direction input derived from throttle position (i.e., forward and reverse). Consistent with the principles described above, when the direction input indicates movement astern (in the boat 10 equipped with the stern thruster 14), if the helm 24 is turned to port, the controller 16 will operate the stern thruster 14 to urge the stern 34 to port. Such control can be based simply on receipt of a helm input to port or starboard above a predetermined input threshold. In addition to a direction of the helm input, a magnitude of the helm input above the threshold could be employed, as will be described in greater detail below.

At higher speeds it may not be desirable to operate the thruster 14 (14A), or it may be desirable to operate the thruster at a lower speed. Accordingly, the controller 16 is further configured to automatically operate the thruster 14 (14A) responsive to a speed input. The speed input is derived for a global positioning system (GPS) determined speed, a water speed sensor, an engine speed or the like. Above a predetermined upper speed threshold, the controller 16 is preferably configured not to automatically operate the thruster 14 (14A). Other, lower speed thresholds could be used to automatically increase thruster 14 (14A) output as speed decreases and/or thruster speed control could be varied in inverse proportion with vessel speed up to the upper speed threshold.

Some vessels, such as watersports boats, are equipped with ballasting systems. In such vessels, the controller 16 is preferably configured to automatically operate the thruster 14 (14A) responsive to a ballast input. For example, with ballast level detected above a predetermined level threshold, the controller 16 automatically increases thruster speed to compensate for the effect of the additional ballast.

In addition to controlling thruster speed based on a vessel speed input and a ballast input, the controller 16 can be further configured to vary thruster speed based on the magnitude of the helm input. For example, if the helm input in a given direction (i.e., port or starboard) is greater than a predetermined threshold, the controller will automatically increase thruster 14 (14A) speed. Multiple thresholds could be employed or speed could be varied continuously over a range of helm input up to a predetermined maximum speed (which could be dependent on vessel speed, ballast level, etc.). Alternately, the controller 16 could simply operate the thruster at a single predetermined speed once helm input in a given direction is detected beyond a minimum threshold, regardless of the magnitude of input past that point.

The system 12 preferably further includes a user interface device 40, such as a touch screen and/or multi-function controller. Via the user interface device 40, an operator of the boat 10 can opt to enable or disable automatic control of the thruster 14 (14A) via the controller 16. Advantageously, the operator can also set the thruster 14 for manual control responsive to a manual control input. The manual control input can be derived via any desired input device, such as a joystick, multi-function controller, touch screen icons, etc. When operated manually, the manual control inputs can be processed via the controller 16 or transmitted directly to the proportional drive 20 (or other drive) of the thruster 14 (14A).

Via the user interface device 40, the operator is preferably also able to vary operational settings of the controller 16 when operating the thruster 14 (14A) automatically. For example, a user setting input can be used to select a speed or speed range at which the controller 16 operates the thruster 14 (14A). Additionally, threshold values applicable to helm, direction, speed and/or ballast inputs could be varied via the user setting input.

Some boats 10 are equipped with an exhaust port 42 that vents engine exhaust below the waterline at the stern 34. With a stern drive thruster 14, such exhaust can result in cavitation of the thruster. Such cavitation may be avoided by cowling the thruster and/or vectoring engine exhaust away therefrom. Alternately, a second exhaust 44 can employed for use during thruster 14 operation—for example an exhaust 44 venting above the waterline. A crossover device 50 is configured to automatically switch between the exhausts 42, 44. The switching can be directed by the controller 16 based on thruster operation or be effected automatically (e.g., based on differing backpressure at different engine speeds).

It will be appreciated that the thruster system 12 of the present invention affords intuitive thruster control in a manner that reduces demands on the marine vessel operator. In addition to eliminating the need for separate, manual control inputs to actuate a thruster, the system automatically takes into account other potentially relevant factors impacting thruster operation and vessel handling.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within and of the claims appended hereto.

What is claimed is:

1. A boat comprising:
   a hull;
   a primary steering mechanism carried by the hull;
   a control station located on the hull;
   a helm located at the control station, the primary steering mechanism being operable via the helm and a helm input being derived from operation of the primary steering mechanism by the helm; and
   a thruster system carried by the hull, the thruster system including:
      at least one thruster mounted to the hull, the at least one thruster being distinct from the primary steering mechanism; and
      a controller receiving the helm input and configured with program instructions to operate the at least one thruster responsive to the helm input to supplement a corresponding movement of the hull;
   wherein the controller is configured to operate the at least one thruster once the helm input is above a minimum threshold in a given direction.

2. The boat of claim 1, wherein the primary steering mechanism includes a rudder.

3. The boat of claim 2, wherein the helm input is derived via monitoring a position of the rudder.

4. The boat of claim 1, wherein the controller is further configured to distinguish between forward and aft operation based on a direction input when operating the at least one thruster responsive to the helm input.

5. The boat of claim 4, wherein the direction input is derived from distinguishing between a forward and reverse throttle position.

6. A boat comprising:
a hull;
a primary steering mechanism carried by the hull;
a control station located on the hull;
a helm located at the control station, the primary steering mechanism being operable via the helm and a helm input being derived from operation of the primary steering mechanism by the helm; and
a thruster system carried by the hull, the thruster system including:
at least one thruster mounted to the hull, the at least one thruster being distinct from the primary steering mechanism; and
a controller receiving the helm input and configured with program instructions to operate the at least one thruster responsive to the helm input to supplement a corresponding movement of the hull;
wherein the controller is further configured to distinguish between forward and aft operation based on a direction input when operating the at least one thruster responsive to the helm input; and
wherein operation of the at least one thruster by the controller during aft operation of the boat is reversed relative to operation of the at least one thruster by the controller during forward operation of the boat.

7. The boat of claim 1, wherein the controller is further configured to operate the at least one thruster responsive to a vehicle speed input indicative of boat speed.

8. The boat of claim 1, wherein the vehicle speed input is derived from at least one of:
a global positioning system determined speed;
a water speed; and
an engine speed.

9. A boat comprising:
a hull;
a primary steering mechanism carried by the hull;
a control station located on the hull;
a helm located at the control station, the primary steering mechanism being operable via the helm and a helm input being derived from operation of the primary steering mechanism by the helm; and
a thruster system carried by the hull, the thruster system including:
at least one thruster mounted to the hull, the at least one thruster being distinct from the primary steering mechanism; and
a controller receiving the helm input and configured with program instructions to operate the at least one thruster responsive to the helm input to supplement a corresponding movement of the hull;
wherein the controller is further configured to operate the at least one thruster responsive to a vehicle speed input indicative of boat speed;
wherein the controller is configured not to automatically operate the at least one thruster above an upper boat speed threshold.

10. The boat of claim 9, wherein the controller is configured with at least one intermediate boat speed threshold below the upper boat speed threshold, the controller automatically lowering a speed of the at least one thruster above the at least one intermediate boat speed threshold.

11. The boat of claim 9, wherein the controller is configured to vary a speed of the at least one thruster in inverse proportion to boat speed up to the upper boat speed threshold.

12. A boat comprising:
a hull;
a primary steering mechanism carried by the hull;
a control station located on the hull;
a helm located at the control station, the primary steering mechanism being operable via the helm and a helm input being derived from operation of the primary steering mechanism by the helm;
a thruster system carried by the hull, the thruster system including:
at least one thruster mounted to the hull, the at least one thruster being distinct from the primary steering mechanism; and
a controller receiving the helm input and configured with program instructions to operate the at least one thruster responsive to the helm input to supplement a corresponding movement of the hull; and
a ballasting system carried by the hull;
wherein the controller is further configured to operate the at least one thruster responsive to a ballast input indicative of a ballast level in the ballasting system.

13. The boat of claim 12, wherein the controller is configured to increase a speed of the at least one thruster with the ballast level above a predetermined level threshold.

14. The boat of claim 1, wherein the controller is configured to operate the at least one thruster at a predetermined speed with the helm input above the minimum threshold, regardless of additional helm input past the minimum threshold.

15. The boat of claim 1, wherein the controller is configured to increase a speed of the at least one thruster upon reaching at least one additional threshold of helm input above the minimum threshold.

16. The boat of claim 1, wherein the controller is configured to continuously increase a speed of the at least one thruster above the minimum threshold up to a predetermined maximum speed.

17. A boat comprising:
a hull;
a primary steering mechanism carried by the hull;
a control station located on the hull;
a helm located at the control station, the primary steering mechanism being operable via the helm and a helm input being derived from operation of the primary steering mechanism by the helm; and
a thruster system carried by the hull, the thruster system including:
at least one thruster mounted to the hull, the at least one thruster being distinct from the primary steering mechanism; and
a controller receiving the helm input and configured with program instructions to operate the at least one thruster responsive to the helm input to supplement a corresponding movement of the hull;
wherein the thruster system further includes a user interface device, the user interface device operable to allow a user to disable automatic control of the at least one thruster by the controller.

18. The boat of claim 17, wherein the thruster system further includes a manual control input operable to allow a user to manually control the at least one thruster, the user interface device operable to allow selection of automatic control of the at least one thruster by the controller responsive to the helm input and manual control of the at least one thruster responsive to the manual control input.

19. The boat of claim 17, wherein the user interface further allows the user to vary operation settings of the controller for automatic control of the at least one thruster.

20. The boat of claim 1, wherein the thruster system further includes a proportional drive via which the controller operates the at least one thruster.

21. The boat of claim 1, wherein the at least one thruster includes a stern thruster mounted athwartship at a stern of the hull, such that operation of the stern thruster in opposite directions will urge the stern to port and starboard, respectively.

22. A boat comprising:
a hull;
a primary steering mechanism carried by the hull;
a control station located on the hull;
a helm located at the control station, the primary steering mechanism being operable via the helm and a helm input being derived from operation of the primary steering mechanism by the helm;
a thruster system carried by the hull, the thruster system including:
  at least one thruster mounted to the hull, the at least one thruster being distinct from the primary steering mechanism; and
  a controller receiving the helm input and configured with program instructions to operate the at least one thruster responsive to the helm input to supplement a corresponding movement of the hull;
a first exhaust port positioned to vent engine exhaust below a hull waterline at the stern;
a second exhaust port positioned to vent engine exhaust above a hull waterline; and
a crossover device configured to automatically switch an exhaust vent path between the first and second exhaust ports;
wherein the at least one thruster includes a stern thruster mounted athwartship at a stern of the hull, such that operation of the stern thruster in opposite directions will urge the stern to port and starboard, respectively; and
wherein the crossover device is configured to automatically switch between the first and second exhaust ports to prevent thruster cavitation during operation of the at least one thruster.

23. A boat comprising:
a hull;
a rudder carried by the hull;
a control station located on the hull;
a helm located at the control station, the rudder being operable via the helm and a helm input being derived from operation of the rudder by the helm; and
a thruster system carried by the hull, the thruster system including:
  at least one thruster mounted to the hull;
  a controller configured with program instructions to operate the at least one thruster to supplement a corresponding movement of the hull responsive to:
    the helm input;
    a direction input indicative of forward and aft operation of the boat; and
    a speed input indicative of boat speed; and
a ballasting system carried by the hull;
wherein the controller is further configured to operate the at least one thruster responsive to a ballast input indicative of a ballast level in the ballasting system.

* * * * *